United States Patent
Sullivan

[15] 3,637,494
[45] Jan. 25, 1972

[54] SECONDARY OIL RECOVERY PROCESS

[72] Inventor: Frank Sullivan, Santa Barbara, Calif.
[73] Assignee: GAF Corporation
[22] Filed: May 29, 1969
[21] Appl. No.: 845,591

Related U.S. Application Data

[63] Continuation of Ser. No. 545,834, Apr. 28, 1966, abandoned.

[52] U.S. Cl. .................................................. 252/8.55 D
[51] Int. Cl. ............................................................ E21b 43/20
[58] Field of Search ..................... 252/8.55 D, 8.5 AC; 166/9

[56] References Cited

UNITED STATES PATENTS

| | | | |
|---|---|---|---|
| 2,476,474 | 7/1949 | Baer | 260/92.8 X |
| 3,070,543 | 12/1962 | Scott | 252/8.5 |
| 3,108,069 | 10/1963 | Monroe et al. | 252/8.5 |
| 3,349,032 | 10/1967 | Krieg | 252/8.55 |

FOREIGN PATENTS OR APPLICATIONS

| | | | |
|---|---|---|---|
| 6,414,645 | 6/1965 | Netherlands | 252/8.5 |

*Primary Examiner*—Herbert B. Guynn
*Attorney*—George L. Tone, Walter G. Hensel and Samson B. Leavitt

[57] ABSTRACT

The secondary recovery of petroleum from subterranean formations by the waterflooding method is improved so that the said formations remain pervious, permit the fluid water to flow unimpeded and displace the residual oil from said formations by incorporating into the fluid water which is injected through an input well into said formations, a composition consisting essentially of a copolymer of methyl vinyl ether and maleic anhydride having a specific viscosity of from about 1.3 to 10 and from about 0.2 percent to about 1.5 percent by weight based on the total weight of the composition, of a mixture of inorganic salts consisting of alkali metal chloride, sodium bicarbonate and either calcium or magnesium chloride.

4 Claims, No Drawings

SECONDARY OIL RECOVERY PROCESS

This application is a continuation of application, Ser. No. 545,834, filed Apr. 28, 1966, now abandoned.

The present invention relates to a new and improved method for the recovery of oil from subterranean oil reservoirs by the waterflooding technique and, more particularly, is concerned with an improved and outstanding process whereby the fluid employed to increase the amount of oil recovery from the oil reservoirs is modified to obtain the characteristics which contraindicate the effectiveness thereof for the purposes hereinafter to be described.

It is conventional practice in the petroleum industry when an underground oil reservoir lacks sufficient natural oil to produce an economically constant flow of oil from the underground reservoir to employ a fluid to displace the oil which is present in the underground reservoir by injecting such fluid and thereby forcing the oil which is present in the reservoir, to the surface. It has been common practice for some time to inject either a gas or water for such purposes. This general technique of obtaining oil which is not readily available under its own pressure, is known as secondary oil recovery. Where water is used as the injected fluid or driving medium, the technique is specifically known as waterflooding, or just flooding.

The oil which is desired to be recovered by such flooding techniques is, as pointed out above, oil which exists as "fixed" oil and is held by absorption or adsorption on the particles of the surrounding underground earth strata and which is usually a sand, or sand clay, or shale formation. This oil is termed fixed oil because it will not naturally flow from the underground earth strata to the surface. In addition to fixed oil there is also present as normally unrecoverable oil, free oil which is located in the voids of the sand, the sand clay mixtures and the shale strata of earth. Both free oil and fixed oil are recoverable to a lesser or greater extent by flooding techniques but such techniques have often been found wanting, especially from their economic feasibility.

The major deficiency of the heretofore employed waterflooding techniques derives from the fact that water mediums will hydrate the subterranean soil formation and particularly the clay soils therein, to render such formations completely impermeable to the driving force of the water and eventually the entire formation becomes "plugged". When such a situation as plugging obtains, the practice has been heretofore to abandon such formation since no amount of driving force acting through the injected fluid will result in any further oil recovery. In the main, waterflooding techniques have been employed and such techniques are the primary ones used for secondary oil recovery, particularly because of the ready availability of suitable waters for such purposes. It has been suggested to employ nonaqueous fluid media as the driving force but usually the economic picture employing such other fluids does not render these techniques feasible.

Another solution to the problem of clay hydration has been to employ inhibited fluids containing high concentrations of salt materials. While this technique has obviated the hydration of the clay, it has not, however, overcome the problem of plugging due to the fact that highly inhibited fluids as have been suggested and used cause the clayey materials to disintegrate to "fines". In this state the clay is, physically, very much like a fine sand, and while plugging does not occur due to the swelling of the clay, nevertheless plugging of the formation occurs as a result of the filling of the voids therein by the sandlike finely divided clay particles.

Since it has been found that only approximately 50 percent of the oil present in subterranean reservoirs is recoverable by primary recovery techniques, it becomes at once evident as to the tremendous value of such secondary recovery methods for obtaining most of the oil out of the ground.

In order to improve the mechanics of waterflooding procedures most efforts in this area have been directed towards increasing the viscosity of the driving fluid or driving water relative to the oil to be recovered. Many materials have been suggested for this purpose and the general class of substances which have been used may be characterized as thickening agents. Among the various thickening agents, numerous natural gums and synthetic polymers have been employed. While the waterflooding operation is improved by increasing the viscosity of the injected water, the major defect which has been described above, namely, the plugging of the formation due to hydration of the clay materials still remains with such improved viscosity fluids.

It is therefore an object of the present invention to provide a process for secondary oil recovery which to a large measure obviates plugging of the subterranean formations due to the hydration of the clay materials contained therein. It is another object of this invention to provide a process of recovering fixed oil from subterranean reservoirs which process results in outstanding and improved yields of oil recovery.

It is still another object of this invention to provide a new, useful and outstanding technique for secondary oil recovery from subterranean oil reservoirs whereby the physical condition of the earth strata so treated is substantially unchanged and thereby permits a more complete recovery of the oil present in the reservoir. Other objects will appear herein as the description proceeds.

It has now been discovered that in secondary oil recovery processes, and primarily where such processes are employed in recovering oil not normally recoverable by primary techniques, from clay-containing subterranean reservoirs, the clay-containing formations can be made to yield substantially all of the free and fixed oil contained therein by using a waterflooding technique or, in other words, an aqueous driving means, wherein the water contains a specific water soluble copolymer and a controlled amount of salt materials.

While, as pointed out above, the use of water-soluble polymer substances is known as an addition in waterflooding processes, it has now been discovered that a combination of the specific copolymer substances hereinafter to be described with a critical concentration of salt materials, produces a stabilizing condition within the subterranean clay-containing oil reservoir so that the flow of water and the subsequent displacement of the oil in the reservoir is substantially unimpeded and the oil thereby readily recoverable.

It is particularly significant that while most of the previous efforts in waterflooding techniques have been directed towards increasing the viscosity of the driving fluid, and while the copolymer employed in the present invention similarly increases the viscosity of the water used in the secondary oil recovery process, it has been discovered that by the addition of the critical amount of the salt materials, the viscosity of the driving fluid is substantially reduced and notwithstanding this factor, there is nevertheless obtained an improvement in the amount of oil which can be recovered. While the particular mechanism is not fully understood, it has been empirically observed that the composition employed in the present invention in the secondary oil recovery technique which forms the primary object acts to stabilize clay-containing substances and particularly, soils so that they remain pervious, i.e., the pore structure of the soil remains unchanged, thereby permitting the fluids to flow unimpeded. As will be demonstrated below, the amount of salt materials employed is especially critical since too large an amount thereof, while resulting in an inhibition of clay hydration, produces a plugging of the well or the subterranean formation due to the complete disintegration of the clay particles to an almost microscopic size. It is only by virtue of the use of a combination of the specific copolymer to be described and the critical amount of salt materials to be shown, that there results a unique equilibrium condition which produces a remarkable stabilizing effect on the subterranean clay-containing soils.

The particular copolymer which is employed in the present invention is a copolymer of an alkyl vinyl ether and maleic anhydride, and particularly lower alkyl vinyl ethers. The preferred copolymer is a methyl vinyl ether-maleic anhydride product. Such a copolymer is well known in the art and may be found fully described in numerous places, among them U.S.

Pat. No. 2,047,398, as well as in "Vinyl and Related Polymers" by Schildknecht, published by John Wiley & Son, New York, 1952, page 628 and following. Generally, such copolymers contain each of the aforementioned chemical moieties in equimolar amounts. For the purposes of this invention, such moieties may be present in the copolymer not only in equimolar amounts but in ratios ranging from about 5:4 to 4:5. The molecular weights of the copolymer may vary considerably, depending upon the general techniques employed in the polymerization process. For the purposes of this invention, any copolymer with a weight average molecular weight ranging from about 500,000 upwards of several million may be used. Such copolymers are further characterized by different viscosity properties, the latter often being employed to define the molecular weight of high polymer materials. In the present invention, the copolymers which may be employed are those which have specific viscosities ranging from about 1.3 to about 10.0. The determination of specific viscosity and the interrelated viscosity, intrinsic viscosity and relative viscosity, are readily determined from well-known equations and all are based upon empirical determinations resulting from viscosity measurements usually employing one gram of copolymer dissolved in 100 ml. of a suitable solvent, e.g., 2-butanone at 25° C.

Salts which may be used and which are essential and critical in the present invention, may be any water-soluble inorganic or organic salts with the proviso, however, that there be present in the composition a minor amount of a multivalent cation. The preferred multivalent cations are calcium and magnesium with the former more preferred. From an economic feasibility point of view, it is preferred to employ inorganic salts, particularly inorganic sodium and potassium salts such as sodium chloride, potassium chloride, sodium nitrate, potassium nitrate, sodium bicarbonate, and as a general class, the alkali metal halides in addition to those already mentioned.

The amount of copolymer material to be used in the water to be injected into the subterranean oil reservoir is an extremely small amount which, in general, ranges from about 0.001 to about 1 percent by weight thereof based on the weight of the total aqueous composition. A preferred range within these broader limits is from 0.05 to 0.5 percent. The total salt concentration should range from about 0.2 to about 1.5 percent and more precisely, it has been determined that the salt concentration should be such that the resistivity of the aqueous fluid lies between about 0.3 to about 1 ohm$^{-1}$. With these aforementioned limitations of salt concentrations and resistivity one may select any combination of water-soluble salts, noting, however, that there should be present an amount of multivalent cation material (e.g., calcium or magnesium) in an amount from about 0.0025 to about 0.25 percent. Again, within this broad range it is preferred to use from about 0.0075 to about 0.125 percent. The remaining inorganic salts comprise the major portion of the total salt content and any combination of concentration within the limits above-defined may be used. The preferred salt is sodium chloride in an amount ranging from about 0.1 to about 1 percent with about 0.5 percent being the most preferred concentration. In the preferred embodiment of the present invention, there should also be present a small amount of bicarbonate anion. The preferred salt of this ion is sodium bicarbonate and the concentration thereof which may be used may range from about 0.02 to about 1 percent.

The following examples will serve to illustrate the present invention without being deemed limitative thereof. In these examples, where parts are used, these should be parts by weight unless otherwise indicated:

EXAMPLE I

In this example, flow rates through a clay core sample are determined, using the following parts and technique: a glass tube 4 inches long and ¾-inch internal diameter is filled with a 1.5 cm. clay core prepared from pulverized field samples, 2 cm. of 80–100 mesh sand and the remainder in the tube, glass wool, in that order. Other such tubes are prepared and separately there is passed through the tubes the following composition:
  A. Water
  B. 1 percent sodium chloride solution in water
  C. a water solution containing 1 percent sodium chloride, 0.2 percent sodium bicarbonate, 0.025 percent calcium chloride, and 0.1 percent of a copolymer (1:1 ratio of monomers) of maleic anhydride with methyl vinyl ether characterized by a specific viscosity of 1.9 * ($\overline{M}_w$=1,300,000)

These solutions are then passed through the filled glass tubes under a pressure of 190 cm. and the amount of fluid passing through the tubes is collected. Composition (A) which is untreated water, almost immediately clogs the tube and after 30 minutes only about 2 cc. of water is collected. Solution (B), after 20 minutes passage, yields a flow through of about 70 cc., and solution (C) a flow-through of about 85 cc. This example demonstrates the superiority of the copolymer salt combination vis-a-vis water alone and a salt solution alone insofar as flow through rates are concerned. Not evident in this demonstration, however, is the fact that while there has been satisfactory flow through using 1 percent sodium chloride solution, the clay sample has begun, after 20 minutes, to disintegrate and shortly thereafter no flow through is obtained. This is in contradistinction to the results obtained in solution (C) where excellent flow through rates persist long after solution (B) has ceased to flow.

EXAMPLE II

As a further illustration of the superiority of the specific composition of the present invention in stabilizing clay soils in secondary oil recovery processes, the following experiment is carried out:
The following four solutions are prepared:

*$\overline{M}_w$ = weight average molecular weight determined by light scattering techniques.
  A. tap water
  B. 0.1 percent sodium chloride, 0.025 percent calcium chloride in tap water
  C. Solution B to which there are further added 0.1 percent of the copolymer employed in example I, and 0.2 percent sodium bicarbonate
  D. 1 percent sodium chloride and 0.1 percent calcium chloride To each of four 8-oz. wide-mouth jars, each containing 25 gr. of graded 10–30 mesh Mojave clay, there is slowly added separately 150 cc. of the four solutions described above. Each jar is capped, inverted gently and permitted to stand for 16 hours at room temperature. Each jar is then inverted five times to loosen the clay and the contents poured directly on to a 30 mesh sieve which is mounted over a 60 mesh sieve. The sieve residues are dried to constant weight and percent distribution and recovery determined. The results are as follows:

With plain tap water 5.2 percent of the clay is retained on the 30 mesh sieve and 1.4 percent on the 60 mesh sieve with total recovery of 6.6 percent. With solution B, 19 percent is retained on the 30 mesh sieve and 44 percent on the 60 mesh sieve, giving a total recovery of 63 percent. Solution C results in 44.5 percent retention on the 30 mesh sieve and 31 percent retention on the 60 mesh sieve for a total recovery of 75.5 percent. Solution D gives a recovery retention of 10 percent on the 30 mesh sieve, 22 percent on the 60 mesh sieve and a total recovery therefore of 32 percent of the clay.

An analysis of this data clearly demonstrates that with plain tap water 93.4 percent of the clay is unrecoverable and only 5.2 percent of all of the clay particles present are large enough to be retained on a 30 mesh sieve. Using the salts solution B results in a much higher recovery of total clay but significantly, only 19 percent is retained on the 30 mesh sieve. In other words, somewhat over 80 percent of the clay present has disintegrated to a size retainable on a 60 mesh sieve or smaller. With higher salt concentrations as demonstrated, using solution D, only 32 percent of total clay is recoverable indicating that almost 70 percent thereof has disintegrated to a size smaller than can be retained on a 60 mesh sieve and only 10 percent is still retainable on the 30 mesh sieve. Solution C demonstrates the highest weight recoverability, namely, 75.5 percent with almost one-half (44.5 percent) of all of the clay originally present being substantially unchanged in particle size and almost one third of all of the clay originally present still retainable in the 60 mesh sieve.

This example demonstrates the remarkable stabilizing effect on clay particles of solution C vis-a-vis the other three solutions.

EXAMPLE III

Example I is repeated except that solution C contains as the copolymer a (1:1) methyl vinyl ether-maleic anhydride copolymer of specific viscosity = 2.63 ($\overline{M}_w$=1,390,000). The flow-through of this solution is 120 cc. after 20 minutes.

EXAMPLE IV

Example I is again repeated using the indicated copolymers of 1:1 methyl vinyl ether-maleic anhydride and the flow through rates obtained after 20 minutes are:

|  | Flow Through |
|---|---|
| A. sp. vis. = 3.65($\overline{M}_w$=2,340,000) | 250 cc. |
| B. sp. vis. = 4.0 | 260 cc. |
| C. sp. vis. = 4.2 | 240 cc. |
| D. sp. vis. = 6.0 | 275 cc. |

EXAMPLE V

The general procedure of Example I is again repeated except that the glass tubes which are used are 30 mm. internal diameter and 12 in. long. The clay employed is a screened commercial Mohave Rogers Lake clay (a bentonitic low-yield drilling mud clay) the particle size of which is 10 mesh and larger. The tubes are filled by first plugging the bottom with glass wool, then filling with 2 inches of 80 mesh sand. This is followed with 50 g. of the screened clay described above and then another additional 2 inches of sand. Four tubes are prepared in this manner. Each of the four tubes is then treated with 1 pour volume of four different solutions. The first is treated with a 1.5 percent sodium chloride solution (solution A); the second with a 1.5 sodium chloride solution containing also 0.2 percent of a copolymer similar to the one used in example I (this is solution B); the third with a solution similar to solution B but using as the copolymer the one used in example III (this is solution C); and finally, the fourth with a solution similar to B and C but the copolymer differs in that it has an $\overline{M}_w$=2,600,000 (this is solution D). After permitting these solutions to remain in the tubes for several hours, there is passed through each of the tubes a 1.5 percent sodium chloride solution to determine the flow-through characteristics of the treated clay samples. After 30 minutes, solution A has yielded a flow-through of 20 cc. and the rate has deteriorated to 0 after 30 minutes. Solution B yield a steady 15 cc. per minute and after 30 minutes, 450 cc. have been passed through. Solution C flows at a steady rate of 25 cc. per minute and after 30 minutes, there has been collected 750 cc. Solution D flows at a steady rate of 70 cc. per minute and after 30 minutes there is a flow-through of 2,100 cc.

This example demonstrates the stabilizing effect of the salt-polymer combination on the clay and the improvement which is manifested by an increase in the molecular weight of the polymer. To illustrate further, the effect of a multivalent ion, tube 3 (through which solution C was passed), is treated after the 30 minute test period described above with 100 cc. of a dilute calcium chloride solution and then plain water is passed through the tube and the flow rate determined. Initially, the rate of flow of the plain water is 35 cc. per minute (contrasted with 25 cc. per minute during the first 30 minute test) which rises to about 60 cc. per minute and then gradually falls off with flow ceasing after 18 minutes. The total water which has been collected is 750 cc. Tube 4 which has previously passed 2,100 cc. of the salt solution in 30 minutes is subjected to the passage of plain water and while this tube demonstrated the best in terms of clay stabilization, only 250 cc. of water are collected in 6 minutes, at which time shutoff of the flow occurs. Clearly, the combination of the polymer-salt treatment plus calcium ion has resulted in a most remarkable stabilization of the clay, i.e., even to substantial insensitivity to pure water for a considerable period of time, leastwise as contrasted with the other treatments.

EXAMPLE VI

Example V is repeated using a tube which is aged as in example V but with a solution as used in example III (i.e., copolymer-inorganic salt-calcium ion). Using the 1.5 percent sodium chloride solution gives a flow rate of 50 cc. per minute which is steady for 30 minutes. After this time, the salt solution is replaced by plain water and the rate continues at 50 cc. per minute for 30 more minutes with substantial shutoff occurring after about 45 minutes. This demonstrates the advantage of using the composition of example III as a pretreatment for the clay and stabilization thereof over the sequential treatment shown in example V.

In addition to the outstanding flow rate characteristics which are achieved by the compositions described in this invention and in addition to the remarkable degree of clay stabilization afforded thereby, the process of the present invention and the compositions used therein afford still another outstanding and unexpected major achievement. This third major achievement lies in the ability of the herein-disclosed composition not only to stabilize clay-containing soils to the remarkable degree indicated above, but further, by stabilizing the clay materials, there is achieved a condition and characteristic of the clay particles which manifests itself even when subsequent treatments are carried out with plain or untreated water, as shown above, or with brine solutions. In other words, having made one or several passes through the clay-containing soils with the compositions of the present invention, it then becomes possible to continue waterflooding operations with ordinary, untreated water or brine without disturbing the original characteristics of the subterranean clay-containing strata. This of course is an extremely valuable and unexpected result since secondary oil recovery operations can then proceed under the most advantageous economic outlook with optimum oil recovery occurring.

Still another outstanding effect resulting from the use of the clay stabilizing compositions of this invention lies in the discovery that following the stabilization of the clayey materials, it then becomes possible to employ various materials, and particularly cationic substances, to obtain the optimum benefit and effect therefrom. In other words, as a result of the treatment and stabilization of the clay formations using the compositions of the present invention and the techniques described herein, it has been found that such formations have become much less substantive for various materials, and particularly cationic substances which are often employed in conjunction with or in sequential treatment with waterflooding operations. Among the outstanding cation substances which are employed in waterflooding operations are the cationic quaternary ammonium compounds which are used for their germicidal, and in general, their biocidal activity to cut down and/or eliminate undesirable plant and animal growth within the formation. Heretofore tremendous quantities of such quaternary ammonium compounds have been necessary in view of the fact that a major portion thereof becomes lost or inactivated by adsorption and/or from the physical and/or chemical effect with the clay in the formation. The treatment described herein and the compositions disclosed obviate to a major extent this nullification of the biocidal action of the quaternary ammonium compounds by the clayey substances in the oil formations.

What is claimed is:

1. In a process for the secondary recovery of oil from a subterranean formation containing hydratable clays by a water flooding method, the improvement comprising injecting into such formation an aqueous composition effective for inhibiting hydration and disintegration of said clays, said composition consisting essentially of, approximately by weight, water and
   a. 0.001 to 1 percent of a copolymer of methyl vinyl ether and maleic anhydride characterized by a specific viscosity of about 1.3 to 10.0 as determined on a solution of 1 gram of the copolymer in 100 ml. of 2-butanone at 25° C. and
   b. 0.2 to 1.5 percent, and in an amount such that the resistivity of said aqueous composition is between about 0.3 and 1 ohm$^{-1}$, of a water-soluble inorganic salt portion consisting essentially of, approximately by weight of said aqueous composition,
   1. a mixture of alkali metal halide and from about 0.02 to 1 percent of sodium bicarbonate by weight of said composition, and
   2. 0.0025 to 0.25 percent, but less than the amount of component (1), of a chloride of calcium or magnesium.

2. The process of claim 1 wherein said alkali metal halide is sodium chloride employed in an amount of about 0.1 to 1 percent by weight of said aqueous composition.

3. The process of claim 2 employing in said aqueous composition 0.1 percent of said copolymer, 1.0 percent of sodium chloride, 0.2 percent of sodium bicarbonate, and 0.025 percent of calcium chloride.

4. The process of claim 2 employing in said aqueous composition 0.1 percent of said copolymer, 0.1 percent of sodium chloride, 0.2 percent of sodium bicarbonate, and 0.025 percent of calcium chloride.

* * * * *